United States Patent [19]

Kunihiro

[11] Patent Number: 5,040,205
[45] Date of Patent: Aug. 13, 1991

[54] MULTI-CHANNEL CORDLESS TELEPHONE SYSTEM WITH A PLURALITY OF HANDSET UNITS AND BASE UNITS

[75] Inventor: Takushi Kunihiro, Kanagawa, Japan

[73] Assignee: Sony Corporation, Tokyo, Japan

[21] Appl. No.: 460,547

[22] Filed: Jan. 3, 1990

[30] Foreign Application Priority Data

Jan. 18, 1989 [JP] Japan .................................. 1-009047

[51] Int. Cl.⁵ .......................................... H04M 11/00
[52] U.S. Cl. ......................................... 379/61; 379/63
[58] Field of Search ....................... 379/58, 61, 62, 63, 379/56

[56] References Cited

U.S. PATENT DOCUMENTS

| | | | |
|---|---|---|---|
| 4,748,655 | 5/1988 | Thrower et al. | 379/60 |
| 4,794,636 | 12/1988 | Sanglier et al. | 379/62 |
| 4,837,802 | 6/1989 | Higashiyama et al. | 379/62 |
| 4,894,856 | 7/1990 | Nakanishi et al. | 379/61 |

FOREIGN PATENT DOCUMENTS

1241929 9/1989 Japan .

*Primary Examiner*—Jin F. Ng
*Assistant Examiner*—William Cumming
*Attorney, Agent, or Firm*—Alvin Sinderbrand; William S. Frommer

[57] ABSTRACT

A cordless telephone of multi-channel access type comprises handset units each operative by a user for initiating a telephone call request; and a base station including a plurality of base units each having a first mode in which the respective base unit is capable of responding to a call request from one of the handset units and a second mode to which the respective base unit is converted for opening a communication channel with that one handset unit and carrying out the telephone call request in response to the reception thereof by the respective base unit while in said first mode, and a controller which controls the base units and is programmed so that, at any time, only one of the base units is in the first mode for responding to a call request from one of the handset units.

2 Claims, 5 Drawing Sheets

FIG. 3 CMND (PRIOR ART)

MULTI-CHANNEL CORDLESS TELEPHONE SYSTEM WITH A PLURALITY OF HANDSET UNITS AND BASE UNITS

BACKGROUND OF THE INVENTION

1. Field of the Invention

The present invention relates generally to cordless telephones and, more particularly, is directed to a cordless telephone of so-called multi-channel access (MCA) type in which a master or base station includes a plurality of sets of transmitting and receiving circuits and communication channels can be simultaneously opened between the master station and a plurality of remote stations or handset units.

2. Description of the Prior Art

Generally, the range of movement permitted the user of a telephone is limited by the length of the telephone cord and practical considerations place a limit on such cord length. To overcome this problem, cordless telephones are coming into more frequent use in this and certain other countries.

Figure 1:
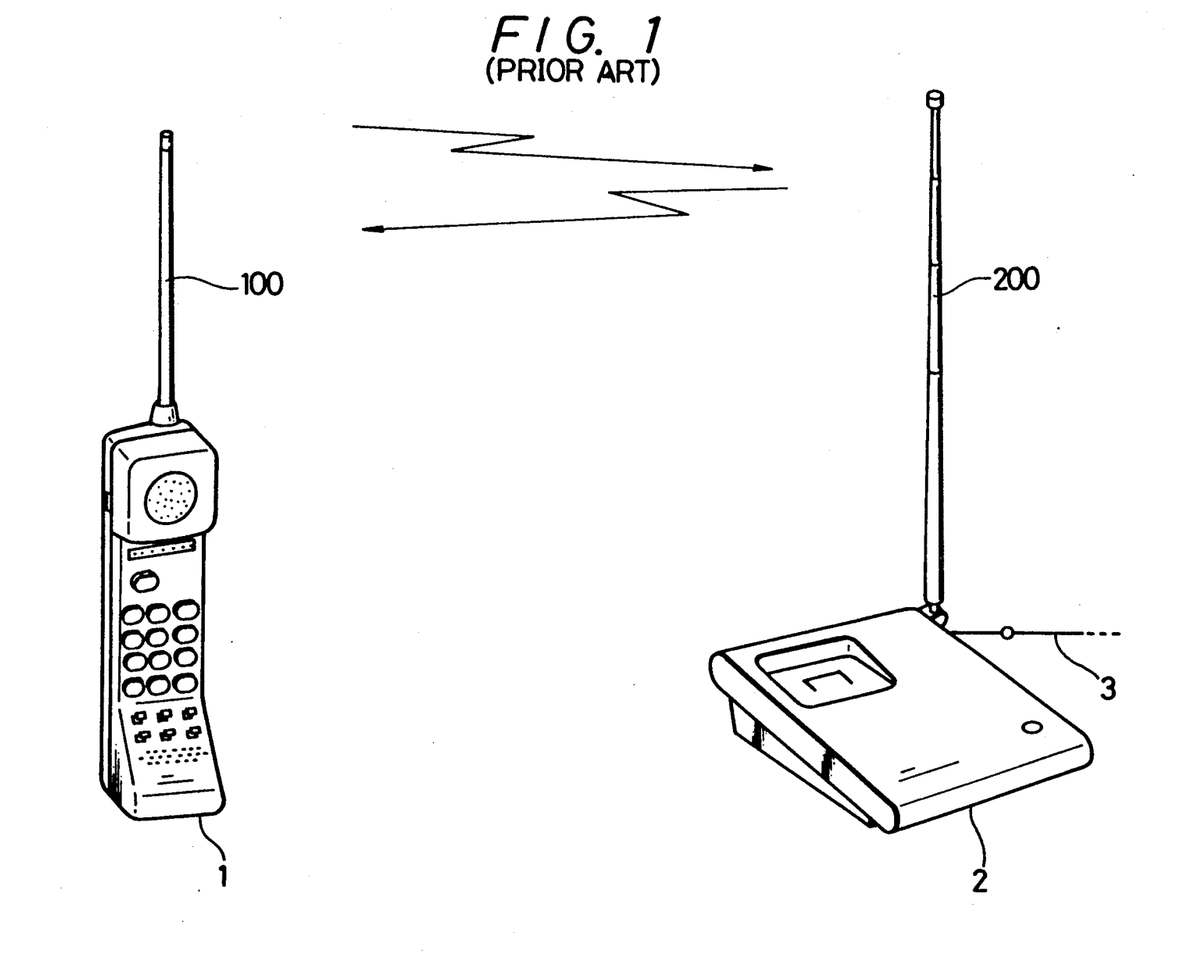
FIG. 1 is a perspective view of a cordless telephone system according to the prior art which includes a single handset unit and a base unit.

Typically, as shown in FIG. 1, such a cordless telephone system consists of a transmitter-receiver 1, in the form of a cordless handset, and a transmitter-receiver 2 forming a so-called base unit that is physically coupled or connected to a telephone network line 3. The handset 1 and the base unit 2 are coupled with each other through radio waves transmitted and received by respective antennas 100 and 200.

The useful distance between the handset 1 and the base unit 2 is referred to as the service area and is typically no more than about 100 meters, with a maximum transmission range being set by the relevant governmental agencies. In Japan, for example, the frequencies of the radio waves transmitted between the handset 1 and the base unit 2 are typically in a 250 MHz band in an up-channel and in a 380 MHz band in a down-channel, and 87 duplex channels are permitted for each system of the MCA type.

In using a cordless telephone, the telephone subscriber can initiate an outgoing call and receive an incoming call through the handset 1 in a manner similar to that used with a standard telephone system, and the telephone subscriber can move about freely with the handset without the annoyance of tangling a lengthy telephone cord.

Figures 2, 3:
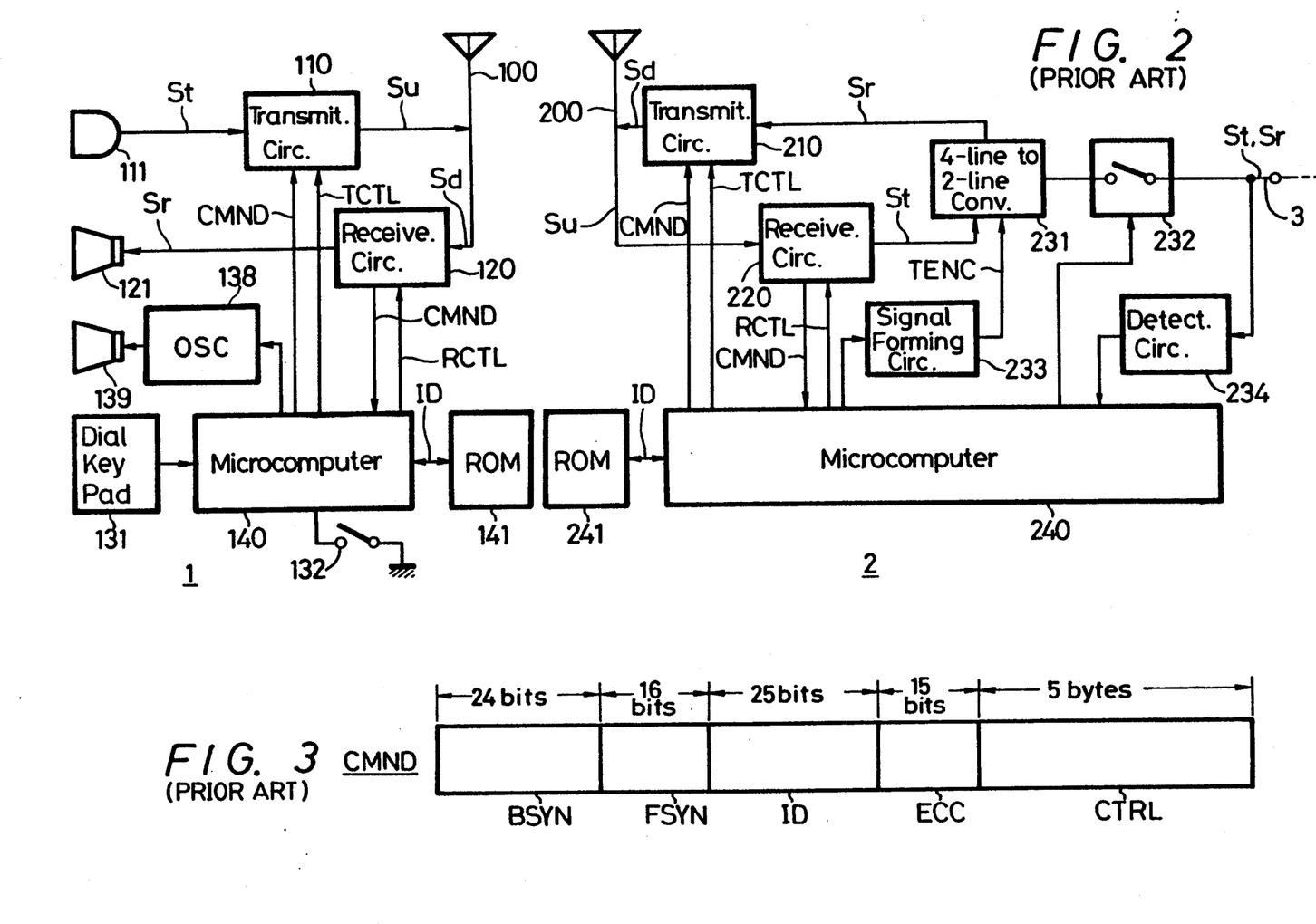
FIG. 2 is a schematic block diagram showing circuitry of the handset unit and the base unit in the cordless telephone system of FIG. 1.
FIG. 3 is a diagram showing a signal format that can be used in accordance with the prior art.

As shown in FIG. 2, in a proposed cordless telephone disclosed in Japanese Patent Application No. 63-68725, the handset unit 1 may generally include a transmitting circuit 110 and a receiving circuit 120. The transmitting circuit 110 converts an audio signal St received from a mouthpiece or microphone 111 and a command signal CMND, which is hereinafter described more fully, to an up channel frequency-modulated (FM) signal Su and transmits the same from the antenna 100. The receiving circuit 120 is adapted to receive a down channel FM signal Sd from the antenna 100 and to demodulate the same to provide an audio signal Sr and a command signal CMND.

A dial key pad 131 and a talk key 132 are connected to a microcomputer 140 which will be hereinafter further described. Each time the talk key 132 is depressed, the operating mode of the handset unit 1 is alternately changed over between a standby mode and a talk mode. When in its standby mode, the handset unit 1 is adapted only for reception of the down channel signal Sd. Conversely, when in its talk mode, the handset unit 1 is adapted for transmission and reception of the up channel and down channel signals Su and Sd.

An oscillator 138 may be energized in response to a signal from the microcomputer 140 for providing an oscillating signal to a speaker 139 so that the latter emits a ringing bell sound.

The microcomputer 140 is further shown to be connected to the transmitting circuit 110 and the receiving circuit 120 and is operative to generate the command signal CMND which is transmitted through the transmitting circuit 110 as part of the up channel signal Su, and also to determine the status or nature of the command signal CMND derived from the receiving circuit 120 in response to the down channel signal Sd. A read only memory 141 is connected with the microcomputer 140 for providing to the latter an identification code ID which identifies the respective handset 1.

The base unit 2 is shown on FIG. 2 to be provided with a transmitting circuit 210 and a receiving circuit 220 generally corresponding to the transmitting circuit 110 and the receiving circuit 120 of the handset unit 1. The receiving circuit 220 is set in the standby mode of the up control channel when a telephone call is not in progress.

Further, the base unit 2 is provided with a four-line to two-line converting circuit 231, a switch circuit 232 corresponding to a hook switch of an ordinary or standard telephone set, a signal forming circuit 233 for generating a dial tone or tone encode signal TENC, which may be a DTMF or dual tone multi-frequency signal, and a microcomputer 240 for controlling the overall operation of the cordless telephone. The microcomputer 240 is connected with a read only memory (ROM) 241 for storing an identification code ID corresponding to that stored in the memory 141 of the associated handset.

As shown in FIG. 3, in a suitable format for the command signal CMND, there are provided, at the head thereof, a bit synchronizing signal BSYN of more than 12 bits, in this example, 24 bits, and subsequent thereto, a frame synchronizing signal FSYN of 16 bits. These signals BSYN and FSYN have particular bit patterns, for example, as follows:

BSYN is "010101010101010101010101" for all channels;

FSYN is "1100010011010110" for the up channels; and

FSYN is "1001001100110110" for the down channels.

The command signal CMND is further shown to include, subsequent to the signal FSYN, a 25-bit identification code ID, a 15-bit error correcting code ECC for the code ID and a 5-byte control code CTRL, arranged in that order.

The control code CTRL includes a code by which the communication channel between the handset unit 1 and the base unit 2 is controlled to open and/or close, a code indicating the transmission of a telephone number of the party to be called, and a code indicating the telephone number of a corresponding telephone apparatus. For example, when the communication channel is opened, the control code CTRL includes data of a first bit pattern and dummy data, whereas, when the control code CTRL indicates the telephone number of the party to be called, the control code CTRL includes data of a second bit pattern and data of a corresponding telephone number. In other words, the control code CTRL includes data (operation code) indicating the kind of control operation to be performed and data (operand) necessary for such control operation.

When the command signal CMND from the base unit 2 is received by the handset unit 1, it is determined by the microcomputer 140 whether or not the identification code ID included in the received command signal CMND is identical with the identification code ID stored in the ROM 141 of the handset unit 1. When the corresponding codes are identical with each other, it is determined that the received command signal CMND is valid. If not, it is determined that the command signal CMND is invalid.

Similarly, when a valid command signal CMND is received by the base unit 2 from the associated handset unit 1, the base unit 2 transmits to the handset unit 1 a command signal CMND unit 2 transmits to the handset unit 1 a command signal CMND including the same identification code ID as was included in the command signal CMND received from the handset unit 1.

In making an outgoing call and in receiving an incoming call, the microcomputers 140 and 240 are operated as follows:

In making an outgoing call from the handset unit 1, depression of the talk key 132 when, for example, the handset unit 1 is in the standby mode, is detected by the microcomputer 140 which supplies a transmission control signal TCTL to the transmitting circuit 110. In response thereto, the transmitting circuit 110 is enabled to transmit an up channel signal Su through the up control channel. Further, the microcomputer 140 forms a command signal CMND in which the control code CTRL indicates the request for an outgoing call. Such command signal CMND is supplied from the microcomputer 140 to the transmitting circuit 110 in which it is converted to the up control channel FM (frequency-modulated) signal Su, and this signal Su is transmitted from the antenna 100 for reception by the antenna 200 of the base unit I.

In the base unit 2, the command signal CMND is derived from the receiving circuit 220 of the base unit 2, and is supplied to the microcomputer 240, which determines therefrom that an outgoing call is being made. Subsequently, the microcomputer 240 causes the switch circuit 232 to be placed in the ON-hook or closed state, thereby connecting the converting circuit 231 through the switch circuit 232 to the telephone network line 3. Simultaneously, the transmitting circuit 210 is enabled by the transmitting control signal TCTL from the microcomputer 240 to transmit the signal Sd of the down control channel. The microcomputer 240 forms the command signal CMND which includes an identification code ID the same as the received identification code ID and a control code CTRL indicating permission to proceed with the outgoing call and the channel number of the communication channel. This command signal CMND is converted to the FM signal Sd in the transmitting circuit 210 and is transmitted through the antenna 200 to the antenna 100 of the handset unit 1.

Then, the receiving circuit 120 of the handset unit 1 derives the command signal CMND from the received down channel signal Sd. This command signal CMND is supplied to the microcomputer 140 which determines therefrom whether or not the identification code ID included in the received command signal CMND is identical with the identification code ID stored in the ROM 141. In the event that the two identification codes are identical with each other, the microcomputer 140 provides the control signals TCTL and RCTL by which the transmitting circuit 110 and the receiving circuit 120 are set in the talk mode through the communication channel identified by the channel number indicated in the control signal CTRL included in the received command signal CMND.

When the communication channel of the handset 1 is thus appointed, the microcomputer 240 supplies the transmitting circuit 210 and the receiving circuit 220 with respective transmitting and receiving control signals TCTL and RCTL, respectively. In response to such control signals TCTL and RCTL from the microcomputer 240, the transmitting circuit 210 and the receiving circuit 220 are set in the talk mode through the communication channel identified by the channel number which the microcomputer 240 in the base unit 2 appoints for the handset unit 1. Accordingly a communication channel is opened between the handset unit 1 and the base unit 2.

When the user inputs the telephone number for the outgoing call by manipulation of the dial key pad 131 of the handset unit 1, the microcomputer 140 forms the command signal CMND in which the control signal CTRL indicates the transmission mode of the telephone number and the telephone number to be called. This command signal CMND is converted by the circuit 110 to the FM signal Su of the communication channel appointed by the base station 2 and such signal Su is transmitted from the antenna 100.

In the base unit 2, the signal Su is received by the antenna 200, and the receiving circuit 220 of the base unit 2 generates the command signal CMND from the received FM signal Su. The control code CTRL of such command signal CMND indicates the transmission mode of the telephone number and the telephone number to be called and, in response thereto, the microcomputer 240 controls the signal forming circuit 233 so as to form a tone encode signal TENC corresponding to the telephone number transmitted from the handset unit 1 and which may be in the form of a dual-tone multi-frequency (DTMF) signal. This tone encode signal TENC is supplied through the converting circuit 231 and the switch circuit 232 to the telephone network line 3. When the called party comes on the line in response to the reception of the tone encode signal TENC, telephone communication becomes possible.

When the telephone conversation is ended, the talk key 132 of the handset unit 1 is released from the talk mode or opened, and the microcomputer 140 responds thereto by providing to the transmitting circuit 110 the command signal CMND whose control code CTRL indicates the end of the telephone conversation. Such command signal CMND is transmitted to the base station 2 in the form of the FM signal Su, and then the transmission of the FM signal Su is stopped by the transmission control signal TCTL from the microcomputer 140.

In response to the transmission to the base unit 2 of the command signal whose control code CTRL indicates the completion of a telephone conversation, the microcomputer 240 controls the switch circuit 232 to return the same to its ON-hook or open state. Further, the microcomputer 240 responds to the corresponding command signal CMND from the receiving circuit 220 by providing a signal TCTL to the transmitting circuit 210 by which transmission of the FM signal Sd is stopped. Accordingly, the base unit 2 is placed in the standby mode for awaiting an incoming call.

When an incoming call is received through the telephone network line 3, the ring tone signal thereof is detected by a detecting circuit 234, and the detected signal is supplied to the microcomputer 240. The microcomputer 240 responds to the detected ring tone signal to form the command signal CMND whose control code indicates the existence of the incoming call and the channel number of the communication channel. This command signal CMND is supplied to the transmitting circuit 210, and the corresponding FM signal Sd is transmitted to the handset unit 1 through the down control channel.

In the handset unit 1, the receiving circuit 220 generates a command signal CMND corresponding to that included in the transmitted signal Sd, and this command signal CMND is supplied to the microcomputer 140. Then, the microcomputer 140 determines whether or not the identification code ID included in such command signal CMND is identical with the identification code ID stored in the ROM 141. If the identification codes are identical, the microcomputer 140 controls the oscillating circuit 138 to provide a ring signal. This ring signal from the oscillating circuit 138 is supplied to the speaker 139 from which a bell sound emanates for indicating an incoming call.

When the talk key 132 is changed from the standby mode to the talk mode, processing similar to that described above for making an outgoing call is performed, whereby the handset unit 1 is connected to the telephone network line 3 via the communication channel and the base unit 2. Therefore, telephone communication with the calling party can be carried out.

When the telephone conversation is ended, the talk key 132 is changed from the talk mode to the standby mode, whereby the microcomputer 140 generates a command signal CMND for indicating the termination of the telephone conversation. This command signal CMND is transmitted in the form of the FM signal Su, from which the receiving circuit 220 derives a corresponding command signal CMND indicating to the microcomputer 240 that the conversation is ended, and then further transmission of the FM signal Su is inhibited by the transmission control signal TCTL from the microcomputer 140. The microcomputer 240 responds to the indication that the conversation is ended by providing control signals tCTL and RCTL by which signal transmission by the transmitting circuit 210 in the base unit 2 is inhibited and the receiving circuit 220 is changed to its standby mode for the up control channel by the control signal RCTL. Further, the switch circuit 232 is changed to its ON-hook state. Therefore, the handset unit 1 and the base unit 2 are placed in the standby mode for making an outgoing call or for receiving an incoming call.

Although the above-described cordless telephone system permits the user to move over a relatively wide area away from the base unit 2 while either making or receiving a call by means of the handset unit I, the use of such cordless telephone system is otherwise undesirably limited by the provision of only a single handset unit in association with a single base unit. Accordingly, a so-called multi-cordless telephone system has been proposed in which a plurality of handset units are associated with a single base unit. In this proposed multi-cordless telephone system, all of the handset units have a common identification code ID, so that any one of the handset units can communicate with the single base unit, but, when one handset unit is thus operated, the other handset units cannot be used.

In order to avoid the above problems, it has been proposed to provide a multi-cordless telephone system in which a plurality of handset units are associated with a plurality of base units located at a common base station and adapted for connection to respective telephone network lines. However, this proposal is disadvantageous in that, when any one of the handset units is operated to make an outgoing call, all of the base units simultaneously respond to the resultant transmission from the operated handset unit.

OBJECTS AND SUMMARY OF THE INVENTION

Accordingly, it is an object of the present invention to provide an improved multi-channel access type cordless telephone which can eliminate the above noted defects encountered in the prior art.

More specifically, it is an object of the present invention to provide an improved multi-channel access type cordless telephone, as aforesaid, which is of simple arrangement and which employs a number of handset units associated with a base station at which there are a plurality of base units under the control of a controller programmed so that only one base unit is conditioned at any time to respond to a telephone call request initiated at any one of the handset units.

According to an aspect of the present invention, there is provided a cordless telephone of multi-channel access (MCA) type, comprising: a handset unit including means for initiating a telephone call request; and a base station including a plurality of base units each having a first mode in which the respective base unit is capable of responding to a call request from the handset unit, and a second mode to which the respective base unit is converted for opening a communication channel with the handset unit and carrying out the telephone call request in response to the reception thereof by the respective base unit while in its first mode, and a controller which controls the plurality of base units so that, at any time, only one of the base units is in its first mode for responding to a call request from the handset unit.

In a preferred embodiment of the invention, there are a plurality of the handset units associated with the base station, each of the base units provides an in-use signal at a first level when unoccupied and at a second level when in use for opening the communication channel with one of the handsets initiating a telephone call request, the controller detects the in-use signal from each of said base units and selectively provides enable signals to the base units, and the controller is programmed to determine which, if any, of the in-use signals are at the first level thereof, to select one of the base units determined to have its in-use signal at the first level and to supply an enable signal at a first level to that one base unit for establishing the first mode thereof only so long as the respective in-use signal remains at the first level thereof and to change-over such enable signal to a second level for inhibiting response of that one base unit to a telephone call request from another of the handset units when the respective in-use signal is at the second level thereof.

The above, and other objects, features and advantages of the present invention, will become apparent in the following detailed description of a preferred embodiment when read in conjunction with the accompanying drawings, in which like reference numerals are used to identify the same or similar parts in the several views.

DETAILED DESCRIPTION OF A PREFERRED EMBODIMENT

Figure 4:
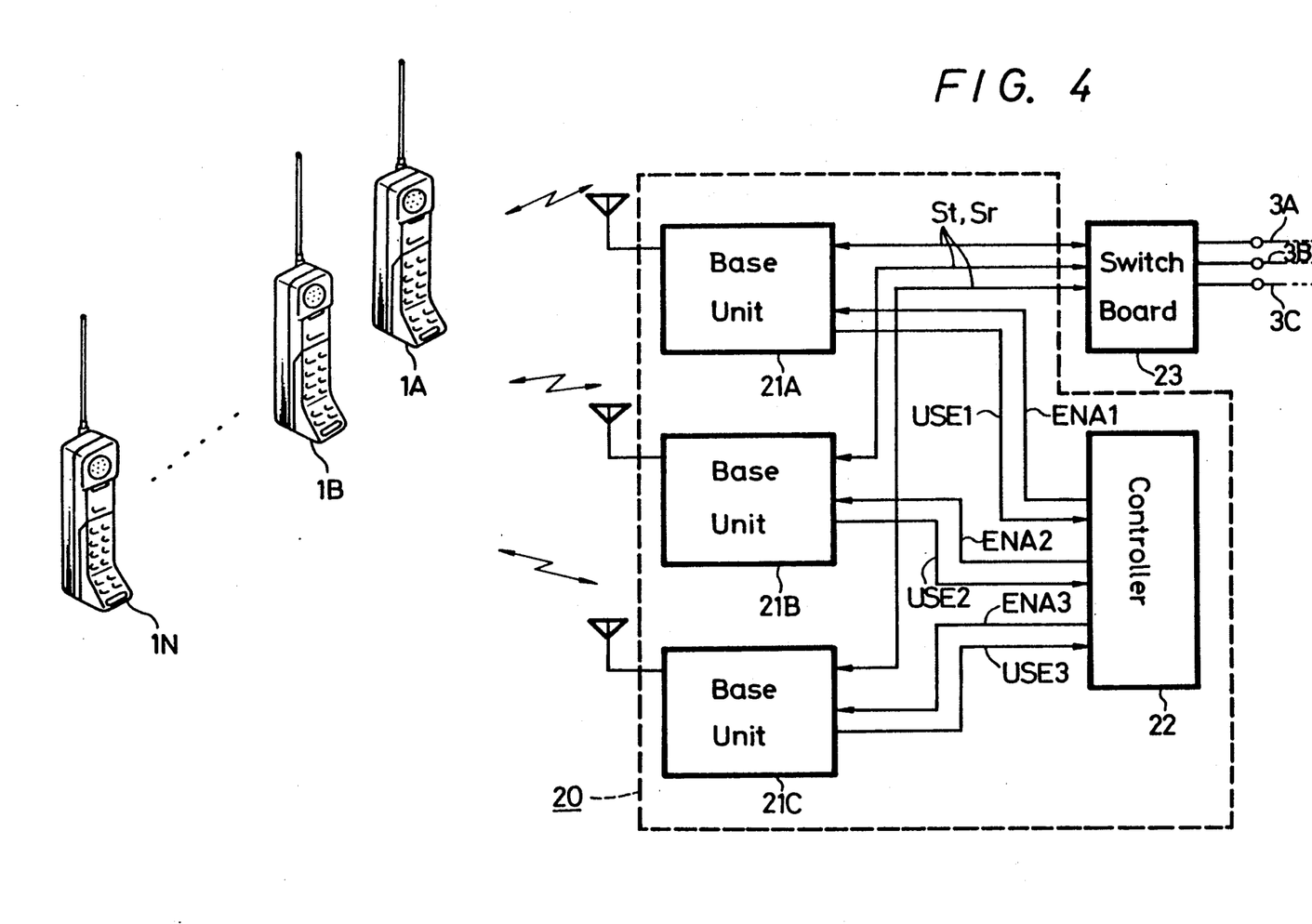
FIG. 4 is a schematic diagram showing a multi-channel access type cordless telephone system according to an embodiment of the present invention.

Referring now to FIG. 4, it will be seen that, in a multi-channel access type cordless telephone system embodying the present invention, there are provided more than three handset units 1A to 1N, and a base station 20 which includes, for example, three base units 21A, 21B and 21C. The handset units IA to 1N and the base units 21A to 21C may each be similar to the handset unit 1 and the base unit 2, respectively, of FIG. 2. Audio signal lines of the base units 21A to 21C are connected through a switching board 23 to telephone network lines 3A, 3B and 3C, respectively. In this case, the switching circuit 232 and the detecting circuit 234 (FIG. 2) of each of the base units 21A to 21C are included within the switching board 23.

The base station 20 is provided with a controller 22, and this controller 22 is formed of a microcomputer, such as that commercially available from Intel Corp. under the designation 8051. The controller 22 supplies response enable signals ENA1, ENA2 and ENA3 to the microcomputers 240 of the base units 21A, 21B and 21C, respectively, and the microcomputers 240 of the base units 21A, 21B and 21C supply in-use signals USE1, USE2 and USE3, respectively, to the controller 22.

When the enable signals ENA1 to ENA3 are at high levels (H), the corresponding base units are placed in condition to respond to incoming calls through the control channel from the handset units 1A to 1N. When the enable signals ENA1 to ENA3 are at low levels (L), the corresponding base units are in other modes, as hereinafter described, and are, in any case inhibited from responding to an incoming call request through the control channel from any one of the handset units IA to IN. It is to be noted that two or more of the enable signals ENA1 to ENA3 are never at the high level (H) simultaneously.

The base units 21A to 21C may be of a type that are all placed in a standby mode for responding to incoming calls through the control channel, but only one of the base units 21A–21C, at any time, is actually conditioned for such response by the respective enable signal ENA1 to ENA3 from the controller 22, as is the case in the illustrated embodiment of the present invention. Alternatively, at any time, only one of the base units 21A to 21C may be placed in its standby mode for responding to an incoming call through the control channel, while the other base units are placed in a sleep mode.

Further, the in-use signals USE1 to USE3 change their levels in accordance with the modes of the corresponding base units 21A to 21C. More specifically, the in-use signals USE1 to USE3 go to a high level (H) when the corresponding base units 21A to 21C open the communication channel, whereas they go to a low level (L) when the corresponding base units close the communication channel.

The operation of the multi-cordless telephone of FIG. 4 by the controller 22 will now be described with reference to FIGS. 5A and 6.

Figure 5A:
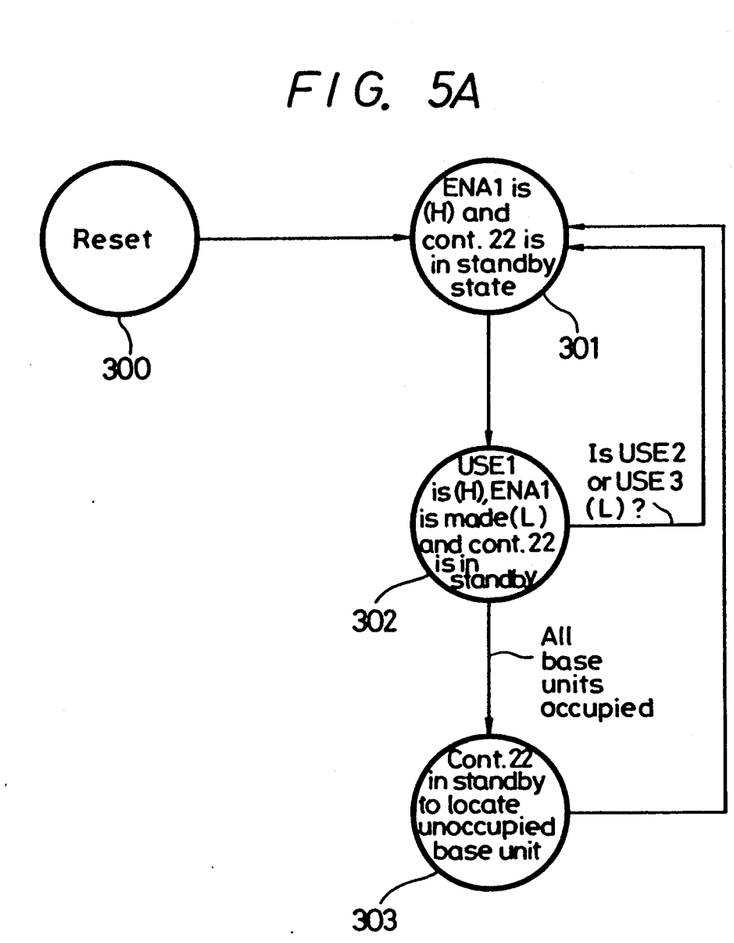
FIG. 5A and 5B are diagrams of state transitions, and to which reference will be made in explaining the operation of the multi-channel access type cordless telephone system according to the present invention.
Figure 6:
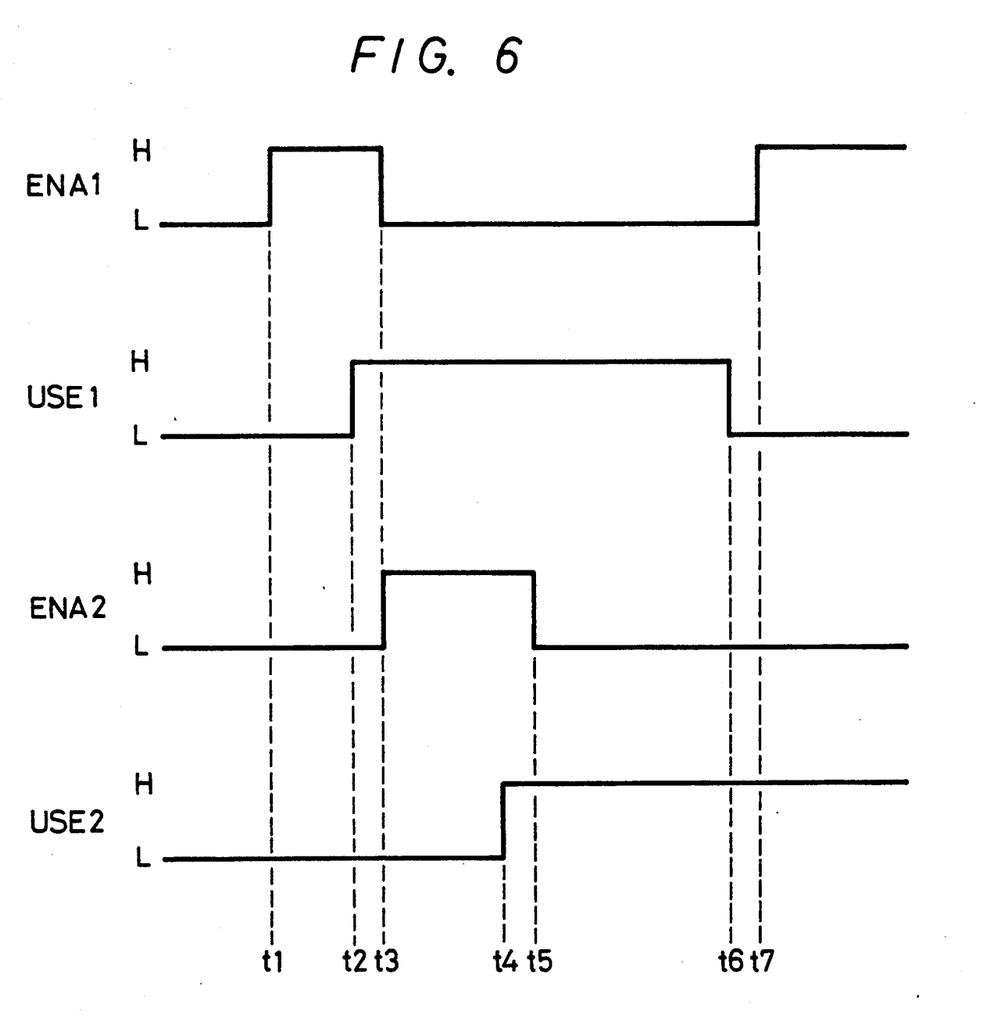
FIG. 6 is a timing chart to which reference will be made in explaining the operation of the multi-channel access type cordless telephone system according to the present invention.

Initially, for example, before the time $t_1$ on FIG. 6, the controller 22 causes all of the response enable signals ENA1 to ENA3 for the base units 21A to 21C to be at the low level (L), whereby the base units 21A to 21C are all placed in reset modes, as at the state 300 on FIG. 5A.

Subsequently, one of the enable signals ENA1 to ENA3, for example, the enable signal ENA1, is made to go to the high level (H) by the controller 22, as at the time $t_1$ on FIG. 6, whereby the base unit 21A is placed in the state or mode in which the base unit 21A can respond to an incoming call through the control channel from one of the handset units, and the controller 22 is placed in the standby mode or state 301.

In the standby state 301, the controller 22 checks the level of the in-use signal USE1 derived from the base unit 21A which has been conditioned to respond to the incoming call. The controller 22 remains in the standby mode or state 301 until the in-use signal USE1 attains its high level (H), that is, until the base unit 21A is made operable by a call request received from one of the handset units 1A to 1N.

When the in-use signal USE1 attains its high level, as at the time $t_2$ on FIG. 6, the controller 22 determines therefrom that the base unit 21A then opens a communication channel between it and one of the handset units 1A to 1N. Accordingly, the controller 22 causes the enable signal ENA1 to go to the low level (L), as at the time $t_3$ on FIG. 6, and the controller 22 is placed in the standby state or mode 302 (FIG. 5A).

In the standby mode 302, the controller 22 checks the levels of the in-use signals USE2 and USE3 derived from the other base units 21B and 21C, respectively. If the in-use signal USE2, for example, is at the low level (L), the controller 22 causes the respective enable signal ENA2 for the base unit 21B to go to the high level (H), as at the time $t_3$ on FIG. 6, whereby the base unit 21B is conditioned so that it, can respond to the next incoming call request through the control channel from one of the handset units 1A to IN. Then, the controller 22 returns to the standby state or mode 301, and checks the level of the in-use signal USE2 derived from the base unit 21B which is conditioned to respond to the incoming call, and the controller 22 remains in the standby state or mode 301 until the in-use signal USE2 attains the high level (H).

When the in-use signal USE2 attains the high level (H), as at time $t_4$ on FIG. 6, the controller 22 determines therefrom that the respective base unit 21B is in the communication mode, and causes the respective enable signal ENA2 to go to the low level (L), as at the time $t_5$ on FIG. 6. Then, the controller 22 enters the state or mode 302 in which it checks the levels of the in-use signals other then the signal USE2, that is, the signals USE1 and USE3. If the in-use signals USE1 and USE3 are both at the high level (H) the controller 22 determines therefrom that there is then no unoccupied base unit. In response to the foregoing, the controller 22 proceeds to the mode or state 303 in which the controller 22 is in a standby mode for locating an unoccupied base unit.

Thereafter, if, for example, the telephone communication in the base unit 21A, is terminated, the in-use signal USE1 changes from the high level (H) to the low level (L), as at the time $t_6$ on FIG. 6, and the controller 22 detects therefrom that the base unit 21A is in the unoccupied state. Then, the controller 22 causes the enable signal ENA1 for the base unit 21A to go to the high level (H), thereby again conditioning the base unit 21A so that it can respond to an incoming call, as at the time $t_7$ on FIG. 6. Thereafter, the controller 22 returns to the standby state or mode 301, for checking the level of the in-use signal USE1 derived from the base unit 21A which is in condition to respond to an incoming call.

Figure 5B:
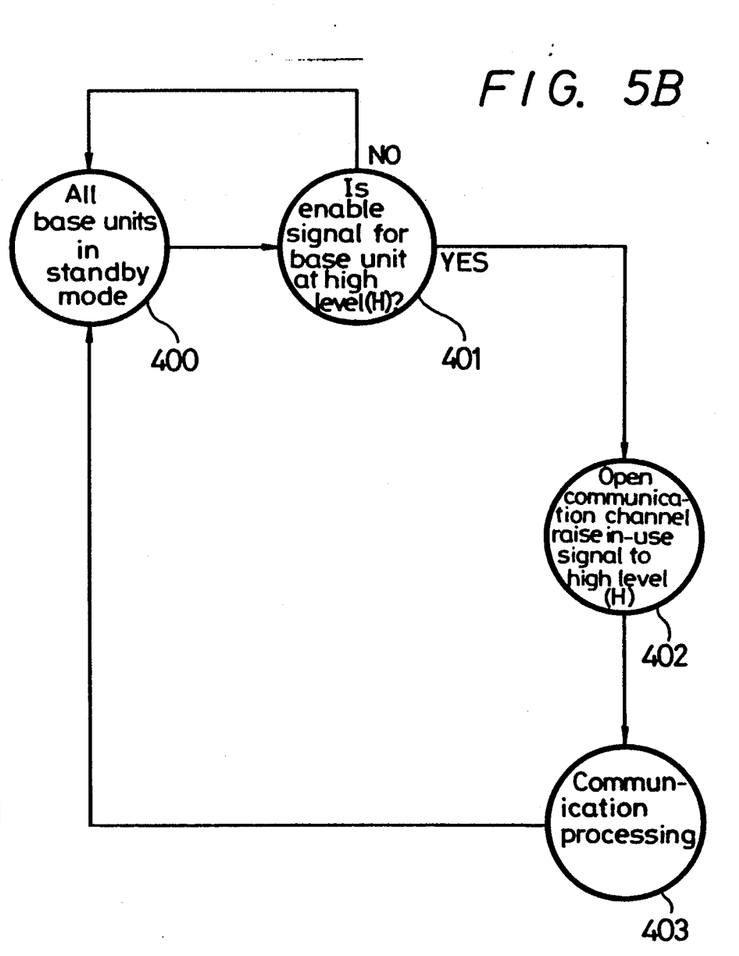

The operations of each of the base units 21A to 21C will now be described with reference to FIG. 5B in which, in an initial state 400, the base units 21A to 21C are all placed in the standby mode for awaiting the outgoing call requests from the handset units 1A to 1N. In the standby mode 400, the in-use signals USE1 to USE3 which the base units 21A to 21C, respectively, supply to the controller 22 are all at the low level (L).

When any one of the base units 21A to 21C receives an outgoing call request command signal CMND from one of the handset units, such base unit 21A, 21B or 21C proceeds to the mode 401. The base unit which is in the mode 401 checks the level of the respective enable signal ENA1, ENA2 or ENA3 from the controller 22. If such enable signal is at the low level (L) the base unit 21A, 21B or 21C determines that it is not in the mode to respond to the incoming call through the control channel. Then, the respective base unit 21A, 21B or 21C does not carry out the outgoing call processing, and returns to the standby mode 400.

On the other hand, if the enable signal ENA1, ENA2 or ENA3 is at the high level (H) in the mode 401, the respective base unit, for example, the base unit 21A, is enabled to respond to the incoming call. Accordingly, the base unit 21A proceeds to the mode 402. In the mode 402, an identification code ID which is the same as the identification code ID of the handset unit initiating the outgoing call, for example, the handset unit 1A, is transmitted from the base unit 21A to the handset unit IA, thereby opening the communication channel between the handset unit IA and the base unit 21A. Simultaneously, the base unit 21A causes the in-use signal USE1 to go to the high level (H) to indicate that base unit 21A is occupied. Then, base unit 21A performs the communication processing in the mode 403. When the telephone conversation is terminated, base unit 21A causes the in-use signal USE1 to go to the low level (L) and returns to the standby mode 400.

As set out above, according to the present invention, the controller 22 controls the plurality of base units 21A to 21C so that only one of them is placed in the incoming call response mode at any time. If one base unit is occupied with processing of a communication, a base unit other than the occupied base unit is placed in the incoming call response mode. When the base unit which is in the incoming call response mode is supplied with an incoming call from a handset unit, such base unit opens the communication channel between it and the handset unit. Thus, the multi-cordless telephone according to this invention can be embodied in a simple arrangement or combination of standard base units. The identification codes ID of the handset units 1A to 1N may be the same or they may be different from one another.

Having described a preferred embodiment of the invention with reference to the accompanying drawings, it is to be understood that the invention is not limited to that precise embodiment, and that various changes and modifications can be effected therein by one skilled in the art without departing from the spirit or scope of the invention as defined in the appended claims.

What is claimed is:

1. A cordless telephone of the multi-channel access type comprising:
 a plurality of handset units each including means for initiating a telephone call request; and
 a base station including:
 a plurality of base units each having a first mode in which the respective base unit is capable of responding to a telephone call request from one of said hand set units, and a second mode to which said respective base unit is converted for opening a communication channel with said one of said handset units and carrying out said telephone call request in response to the reception of said telephone call request by said respective base unit while in said first mode, each of said base units having means providing an in-use signal at a first level when unoccupied and at a second level when in use for opening said communication channel with one of said handsets initiating a telephone call request and
 a controller which controls said plurality of base units so that, at nay time, only one of said base units is in said first mode for responding to said call request from the handset unit, said controller being operative to detect said in-use signal from each of said base units and selectively provide enable signals to said base units, said controller being programmed to determine which, if any, of the in-use signals are at said first level thereof, to select one of the base units determined to have its in-use signal at said first level and to supply said enable signal at a first level to said one base unit for establishing said first mode thereof only so long as the respective in-use signal remains at said first level thereof and to change-over said enable signal to a second level for inhibiting response of said one base unit to a telephone call request from another of said handset units when said respective in-use signal is at said second level thereof.

2. A cordless telephone of the multi-channel access type comprising:
 a plurality of handset units each including means for initiating a telephone call request; and
 a base station including a plurality of base units each having a first mode in which the respective base unit is capable of responding to said call request from one of said handset units, and a second mode to which said respective base unit is converted for opening a communication channel with said one handset unit and carrying out said telephone call request in response to the reception of said telephone call request by said respective base unit while in said first mode, each of said base units including means providing an in-use signal at a first level when unoccupied and at a second level when in use for opening said communication channel with one of said handsets initiating a telephone call request, and a controller for detecting said in-use signal from each of said base units and selectively providing enable signals to said base units, said controller being programmed to determine which, if any, of the in-use signals are at said first level thereof, to select one of the base units determined to have its in-use signal at first level and to supply said enable signal at a first level to said one base unit for establishing said first mode thereof only so long as the respective in-use signal remains at said first level thereof and to change-over said enable signal to a second level for inhibiting response of said one base unit to a telephone call request from another of said handset units when said respective in-use signal is at said second level thereof.

* * * * *